Nov. 8, 1955   H. T. McNALLY ET AL   2,722,879
COULTER CLAMP
Filed Dec. 27, 1952   2 Sheets-Sheet 1
FIG_1
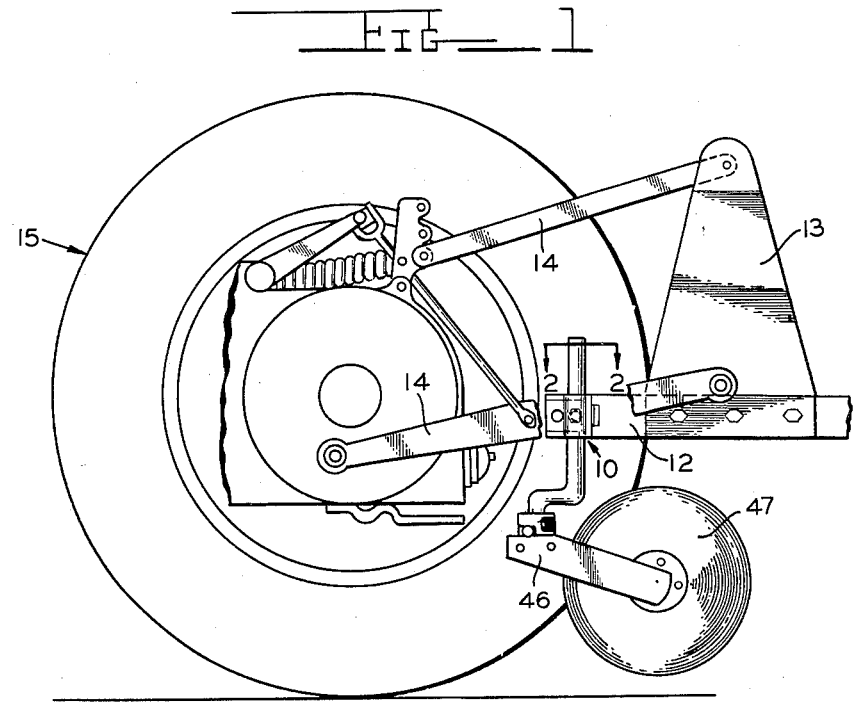
FIG_2   FIG_3
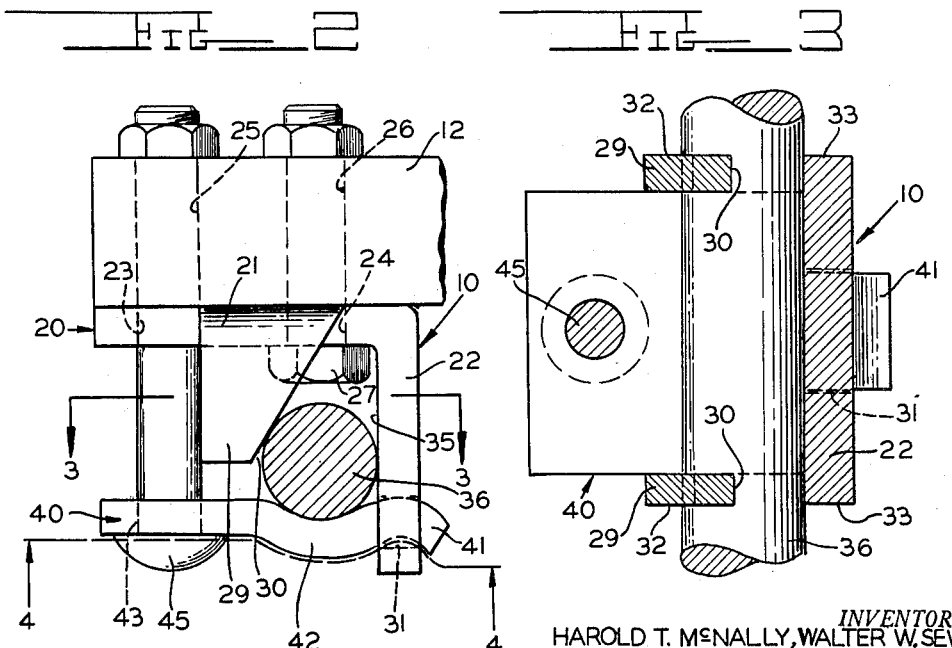
INVENTORS
HAROLD T. McNALLY, WALTER W. SEWELL
& RAYMOND W. WILSON
BY
AND
ATTORNEYS

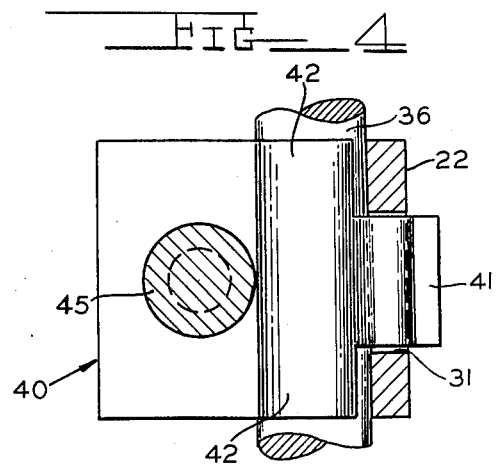
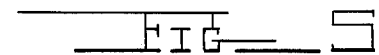

United States Patent Office 2,722,879
Patented Nov. 8, 1955

2,722,879

COULTER CLAMP

Harold T. McNally, Detroit, and Walter W. Sewell, Washington, and Raymond W. Wilson, Ferndale, Mich., assignors, by mesne assignments, to Ford Motor Company, Dearborn, Mich., a corporation of Delaware Application December 27, 1952, Serial No. 328,248

4 Claims. (Cl. 97—198.1)

The present invention relates to a coulter clamp for a plow and more particularly to a clamp for securing a generally cylindrical coulter stem in depending position upon a plow beam.

In plowing with a moldboard plow, it is common practice to provide a disc coulter mounted immediately forward of the moldboard to form the actual furrow slice in advance of the moldboard. Such coulters are commonly suspended from the plow beam through depending stems which are clamped or otherwise secured to the beam in advance of the plow bottom. The coulter stem must be securely clamped to the beam to prevent tilting of the stem, while at the same time accommodating vertical and rotational adjustment of the coulter disc upon loosening of the clamp.

The present invention provides an improved coulter clamp effective to securely clamp a coulter stem to the beam against both vertical and rotational movement while at the same time accommodating coulter stem adjustment upon loosening of the clamp. More particularly, the present invention provides a pivoted clamping plate for urging a coulter stem against a cam surface rigidly mounted on the plow beam, and means are provided for adjustably urging the clamping plate toward the cam surface. Tightening of the clamping plate against the coulter stem increases the engagement of the clamping plate therewith, so that increased resistance to rotational and vertical movement of the stem is obtained as necessary or desired. Further, the clamp and its retaining means are formed as a single unit which may be readily manufactured by mass production techniques and which provides a pair of spaced positioning surfaces against which the stem is urged upon tightening of the pivot plate.

It is, therefore, an important object of the present invention to provide an improved coulter clamp for a plow.

Another important object is the provision of an improved coulter clamp for securing a cylindrical coulter stem to a plow beam against vertical and rotational movement and having a pair of stem-engaging cam surfaces.

It is a further object to provide an improved coulter clamp including a cam surface rigidly mounted on a plow beam and engageable with a coulter stem urged thereagainst by a retaining member pivotally movable relative to the plow beam.

Still another important object is the provision of a coulter clamp including a unitary structure providing spaced angularly disposed stem-engaging surfaces against which a coulter stem is urged by a pivotally movable retaining element to retain the stem against rotation and vertical movement.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary side elevational view of a tractor and a mounted plow provided with a coulter clamp of the present invention;

Figure 2 is a sectional view taken along the plane 2—2 of Figure 1;

Figure 3 is a sectional view taken along the plane 3—3 of Figure 2;

Figure 4 is a sectional view taken along the plane 4—4 of Figure 2; and

Figure 5 is a view of a blank from which certain of the retaining elements of the coulter clamp are formed.

As shown on the drawings in Figure 1, reference numeral 10 refers generally to a coulter clamp of the present invention disposed upon a plow beam 12 of a plow having an upstanding A-frame 13 secured to the trailing hitch links 14 of a tractor 15.

As shown in Figure 2, the coulter clamp includes a clamping plate 20 having an angularly disposed, preferably integrally formed base leg 21 and a stem-contacting leg 22. The base leg 21 is provided with spaced transverse apertures 23 and 24, respectively, which are axially aligned with corresponding apertures 25 and 26, respectively, formed in the beam 12. A bolt 27 is threaded through the aligned apertures 24 and 26 to retain the clamping plate 20 on the beam with the interior face of the base leg 21 in flatwise engagement with the adjacent side face of the beam. The clamping plate 20 is perhaps best illustrated in Figure 5 of the drawings in which the blank from which the clamping plate is formed is illustrated.

It will be noted that the clamping plate blank is generally rectangular in configuration and that the base leg portion 21 thereof is of reduced width when compared with the stem-contacting leg 22 thereof. The shoulders 28, defined at the juncture of the clamping plate portions, are of a width substantially the same as the thickness of the stock from which the blank is formed for a purpose to be hereinafter more fully described. The base leg portion of the blank is provided with opposing oppositely directed cam flaps 29 of identical configuration having inclined cam surfaces 30 facing toward the stem contacting portion 22. The stem-contacting portion 22 of the blank is provided with a generally rectangular aperture 31 for a purpose to be hereinafter more fully described.

During the formation of the clamping plate from the blank, the cam ears 29 are deformed about a fold line 29a so as to extend substantially normal to the surface of the blank and during such deformation, the ears are bent about a relatively small radius, so that the cam flaps have their outer surfaces 32 lying substantially flush with the corresponding surface 33 of the stem-contacting leg 22. Next, the leg portion 22 is deformed from the plane of the blank along a fold line 34 substantially aligned with the shoulders 28, the direction of folding of the stem-contacting leg 22 being substantially the same as the direction of fold of the cam flaps 29.

It will thus be seen that the resulting clamping plate structure illustrated in Figures 2 and 3 provides a pair of angularly disposed surfaces defined by the cam faces 30 of the ears 29 and by the inner surface 35 of the stem-contacting leg 22. The surfaces are convergent toward the beam 12 and the distance therebetween decreases until it becomes less than the diameter of the coulter stem 36 at an appreciable distance from the base leg 21.

When the coulter stem 36 is positioned between the faces 30 and 35 in snug engagement therewith, the stem is laterally aligned with the head of bolt 27, but no interference therebetween is possible inasmuch as the distance between the faces 30 and 35 is less than the diameter of the coulter stem 36 at a point laterally well spaced from the bolt head.

The coulter stem 36 is confined against the surfaces 30 and 35 by means of a pivot plate indicated generally at 40. The pivot plate 40 is provided with a terminal reduced tongue 41 at one end thereof, which is adapted to project through the generally rectangular aperture 31 of the stem-contacting leg 22, as best illustrated in Figure 4. Adjacent the tongue 41, the plate 40 is arcuately contoured about a radius of curvature, as at 42, slightly greater than the radius of the stem 36, so that the pivot plate is in substantial, greater than tangential contact with the coulter stem. The free end of the plate 40 is apertured, as at 43, in lateral alignment with the apertures 23 and 25 of the clamping plate 20 and the beam 12, respectively, to receive therethrough a retaining bolt 45.

It will be appreciated that the bolt 45 serves to urge the free end of the clamping plate toward the base leg of the clamping plate and toward the beam 12. The tongue end 41 of the pivot plate 40 is of arcuate contour so as to provide a hook-like projection extending through the aperture 31 and pivoted movement of the pivot plate, as upon tightening of the bolt 45, will merely cause further projection of the tongue 41 through the aperture 31 so that displacement of the pivot plate from the clamping plate is prevented. Further, it will be seen that movement of the free end of the pivot plate toward the beam will urge the contoured portion 42 of the pivot plate into closer engagement with the coulter stem 36 to urge the coulter stem into better engagement with the cam surface 30 and the surface 35 of the leg 22.

By the provision of the shoulders 28 and the reduced width base portion 21, the cam surfaces 30 are directly opposed to the terminal surfaces of the stem-contacting leg 22. Thus, extended engagement of the stem with the leg 22 is insured, and the cam faces 30 contact the stem at the ends of, and in direct opposition to, the leg 22.

The clamping action exerted by the clamp 10 is effective to retain the coulter stem 36 against both vertical movement and rotative movement. Accordingly, the coulter fork 46 and the coulter disc 47 will be accurately positioned by adjustment of the coulter stem and will be retained in such position during operation of the plow. The simplicity and ease of manufacturing of the coulter clamp will be appreciated since the clamping plate blank and the pivot plate are both formed of simple stampings which are later deformed into their finished configuration, and no castings are utilized and no machining is necessary.

It will, of course, be understood that various details of construction may be varied through a wide range without departing from the principles of this invention and it is, therefore, not the purpose to limit the patent granted hereon otherwise than necessitated by the scope of the appended claims.

We claim:

1. A clamp for securing a depending, generally cylindrical coulter stem to a plow beam, comprising a clamping plate having a base leg in flatwise engagement with a vertical portion of said beam and a stem-contacting leg lying substantially normal to said beam to project laterally therefrom in a substantially vertical plane, means securing said base leg to said beam, a cam ear projecting normally from the plane of said base leg and away from said beam, said cam ear hving a cam face directed toward said stem contacting leg and having a portion spaced therefrom a distance less than the diameter of said stem, a pivot plate having its one end pivotally connected to said stem contacting leg and adapted to contact said coulter stem in spaced relation to said cam face, and means for urging said pivot plate toward said base leg to confine said stem between said pivot plate, said stem-contacting leg and said cam face.

2. A clamp for securing a depending, generally cylindrical coulter stem to a plow beam, comprising a clamping plate having an integral base leg in flatwise engagement with a vertical portion of said beam and an integral stem-contacting leg lying substantially normal to said beam to project laterally therefrom in a substantially vertical plane, means securing said base leg to said beam, a cam ear formed integrally with said base leg and projecting normally from the plane of said base leg and away from said base, said cam ear having an inclined cam face directed toward and directly opposing said stem-contacting leg, a medial portion of said cam face being spaced from said stem-contacting leg a distance less than the diameter of said stem, a pivot plate having a medial surface contoured to snugly contact said coulter stem in spaced relation to said cam face and said stem-contacting leg, and tongue and slot means interconnecting said pivot plate and said stem-contacting leg and accommodating pivotal movement of said pivot plate toward said base leg to confine said stem between said pivot plate, said stem-contacting leg and said cam face.

3. A clamp for adjustably retaining a coulter stem on a plow beam, comprising a base plate secured to the beam, said base plate having an integrally formed flange projecting normally therefrom and away from said beam, said flange having a side surface for extended surface engagement with the stem, said base plate also having an integrally formed cam ear projecting normally therefrom and away from said beam, said cam ear having a cam surface engageable with said stem in opposed relation to said flange, said flange side surface and said cam surface being convergent toward the beam to receive said stem therebetween, and means pivoted to said base plate and urged toward the same to confine said stem in engagement with said cam surface and said flange in laterally spaced relation to said beam.

4. For use with a plow having a beam, the improvement of a clamp for rigidly attaching a coulter stem to said beam, said clamp comprising a base plate, and means for securing said base plate to said beam, a pair of cam elements formed integrally with said base plate and projecting normally therefrom to extend away from said beam, a stem-contacting flange formed integrally with said base plate and projecting normally therefrom and away from said beam, said cam elements having cam surfaces facing said flange, said cam surfaces and said flange being laterally outwardly divergent from said beam and having medial portions spaced through a distance less than the diameter of said stem, clamping means pivotally connected to said flange and movable relative to said beam towards and away from said cam surfaces and said medial flange surface to confine said stem therebetween, and means urging said clamping means toward said beam to confine said stem between said clamping means, said stem-contacting flange and said cam face.

References Cited in the file of this patent

UNITED STATES PATENTS

| 1,925,699 | Marshall | Sept. 5, 1933 |
| 2,322,583 | Marshall | June 22, 1943 |
| 2,385,950 | Silver | Oct. 2, 1945 |

FOREIGN PATENTS

| 441,776 | Germany | Mar. 12, 1927 |